United States Patent [19]
Chill et al.

[11] 3,807,918
[45] Apr. 30, 1974

[54] EXTRUSION DIE FOR FORMING A MULTICOMPONENT CONTINUOUS FILM OF THERMOPLASTIC POLYMER

[75] Inventors: Leonard Chill, Waynesboro, Va.; Gordon B. Johnson, Sausalito; Carl S. Weisner, Pleasant Hill, both of Calif.

[73] Assignee: Chevron Research Company, San Francisco, Calif.

[22] Filed: Dec. 21, 1972

[21] Appl. No.: 317,502

Related U.S. Application Data

[62] Division of Ser. No. 114,796, Feb. 12, 1971, Pat. No. 3,761,552.

[52] U.S. Cl............................. 425/131, 425/462
[51] Int. Cl................................................ B29f 3/12
[58] Field of Search .......... 425/130, 376, 382, 462, 425/131; 264/171

[56] References Cited
UNITED STATES PATENTS

| | | | |
|---|---|---|---|
| 3,032,008 | 5/1962 | Land et al...................... | 425/382 X |
| 3,151,356 | 10/1964 | Seuecal......................... | 425/462 X |
| 3,281,899 | 11/1966 | Dacco........................... | 425/130 X |
| 3,557,265 | 1/1971 | Chisholm et al............... | 425/382 X |
| 3,606,636 | 9/1971 | Glass et al. ................... | 425/382 X |

FOREIGN PATENTS OR APPLICATIONS

7,006,805  11/1970  Netherlands...................... 264/171

*Primary Examiner*—R. Spencer Annear
*Attorney, Agent, or Firm*—R. L. Freeland, Jr.; C. J. Gibeau

[57] ABSTRACT

An elongated flat die is utilized to extrude parallel streams of different molten polymers bonded together on edge to form a continuous thermoplastic polymer film of alternating stripes. Desired combinations can be obtained by preselecting the different molten polymer streams or by adjusting the die. The congealed film may be further processed to make a yarn.

5 Claims, 8 Drawing Figures

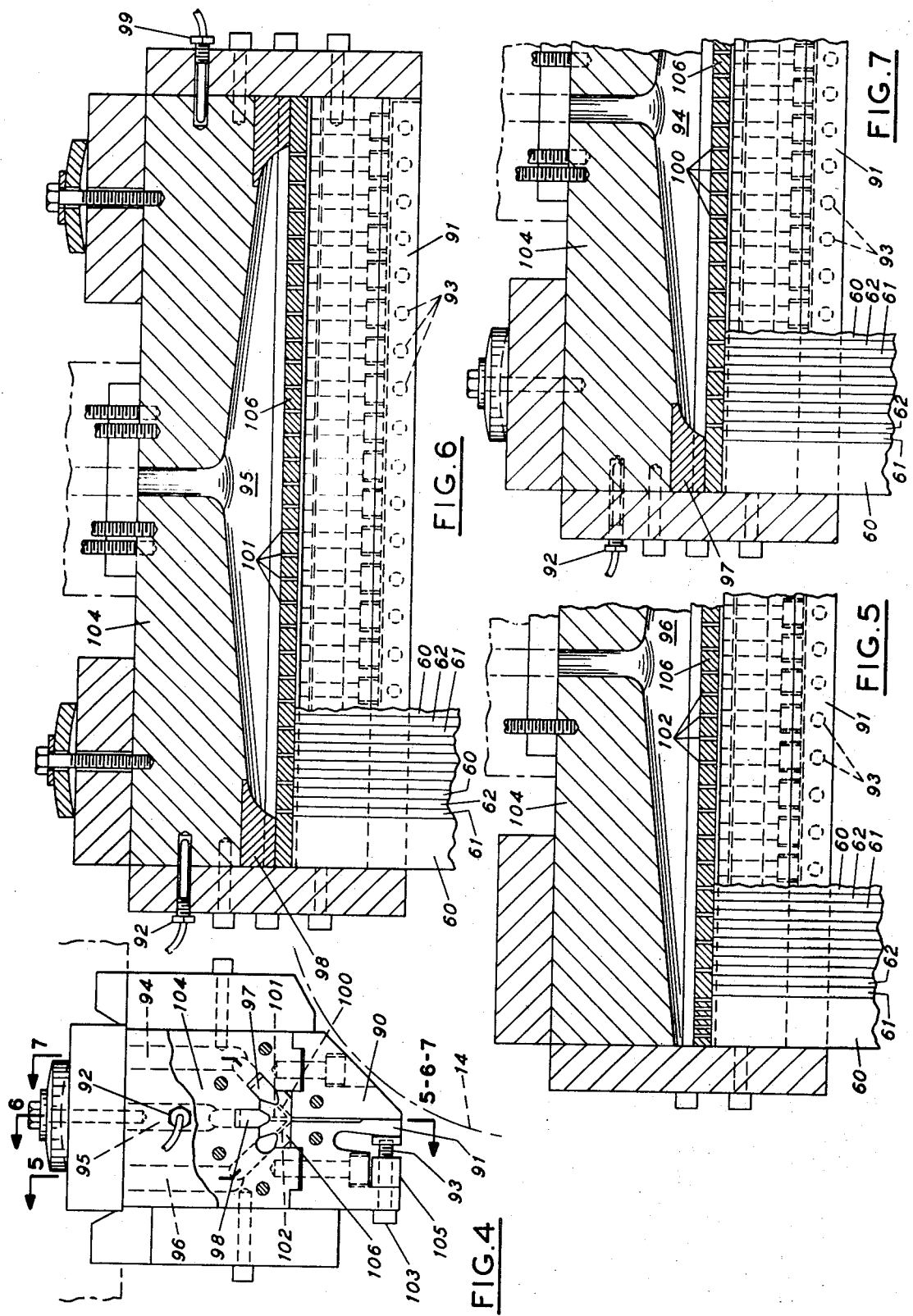

EXTRUSION DIE FOR FORMING A MULTICOMPONENT CONTINUOUS FILM OF THERMOPLASTIC POLYMER

This is a division of application Ser. No. 114,796 filed Feb. 12, 1971 now U.S. Pat. No. 3,761,552.

FIELD OF INVENTION

This invention is directed to an extruding head apparatus for continuously producing a multicomponent thermoplastic polymer film which may be used to make a yarn.

BACKGROUND OF THE INVENTION

Yarn has traditionally been produced by separating or carding natural fibers and then twisting several strands together. Recently, synthetic fibers have been made by extruding molten polymer through spinerettes to form fine threads or strands which are then twisted to make yarn. A more recent development has been the use of sheets of polymer film as raw material for producing thin strips which are fibrillated and twisted to make yarn. Several patents have been obtained on processes for fibrillating polymer film. See, e.g., U.S. Pat. Nos. 3,491,928, 3,496,259, 3,496,260, and 3,511,901. The existing art in the polymer film-to-yarn field, however, does not encompass the production of yarn from a single polymer film made of edge bonded strips of different thermoplastic polymers. Yarn made from thermoplastic polymer film is especially suitable for heavy duty uses such as indoor-outdoor carpets or so-called contract carpets (schools, offices, etc.) because of their high wear resistance and ease of cleaning. Polymer stability (resistance to deterioration) can be obtained by the inclusion of chemical inhibitors.

A longstanding problem in producing yarn has been the difficulty in twisting yarns together in a uniform manner so that the finished product has a uniform appearance. Also, the individual yarn lots would often vary so that a constant mix could not be obtained.

It is, therefore, an object of this invention to provide an extruding head for producing a multicomponent continuous thermoplastic polymer film suitable for making a yarn.

BRIEF DESCRIPTION OF INVENTION

The present invention comprises an extrusion die which can be used in a continuous process for producing yarn from a multicomponent thermoplastic polymer film. Thermoplastic polymers of different characteristics which form films on extrusion are introduced at high temperature and pressure to a die from which they are extruded as film. The die has a separate conduit and a series of outlets for each different polymer so that the extruded film contains the different characteristics in alternating sequence. The polymer film may then be oriented in the longitudinal direction from 5 times its original length up to the point at which incipient fibrillation occurs to increase longitudinal stress strength. The draw ratio is chosen to provide a finished product with suitable denier and texture. The film may then be cut in strips of uniform width along the direction of the longitudinal axis. In order to achieve a random effect along the edges of these strips (the edges of the strips having a significant effect on the appearance of the yarn), the film may be oscillated across the direction of the longitudinal axis prior to cutting. The amplitude and frequency of the oscillation may be varied to alter the appearance of the finished product. After cutting, the strips of film are fibrillated to produce a fibrous network which upon twisting simulates the structure of natural fiber yarn. The different characteristics of the different polymers incorporated in the continuous sheet of film extruded through the apparatus of this invention are preselected to assist achieving in the yarn subsequently made from this film the appearance and some of the desired characteristics of yarns made from natural fibers.

The process of the present invention can be applied to any film-forming thermoplastic polymer. Thermoplastic polymers, which are capable of forming films on extrusion, are amenable to subsequent longitudinal orientation and fibrillation. Examples of suitable thermoplastic polymers are polypropylene, nylon, polyesters, vinyl chloride, and polyethylene.

BRIEF DESCRIPTION OF THE DRAWINGS

A more complete understanding of the process and apparatus of the present invention can be obtained by reference to the accompanying drawings which are hereby incorporated into this specification which illustrate the extruding head of this invention both in detail and and as incorporated in apparatus which further illustrates its utility and in which:

FIG. 4 is a cut-away end view of the die means of my invention.

FIG. 5 is a sectional view of the die means illustrated in FIG. 4. The sectional view illustrates the production of stripes of a single polymer.

FIG. 6 is also a sectional view of the die means illustrated in FIG. 4. FIG. 6 also illustrates the production of stripes of another single polymer which is different from that shown in FIG. 5.

FIG. 7 is a further section of the die means of FIG. 5. This section also illustrates the production of stripes of still another single polymer which is different from those shown in FIGS. 5 and 6.

DESCRIPTION OF THE PREFERRED EMBODIMENT

Figures 1, 1A:
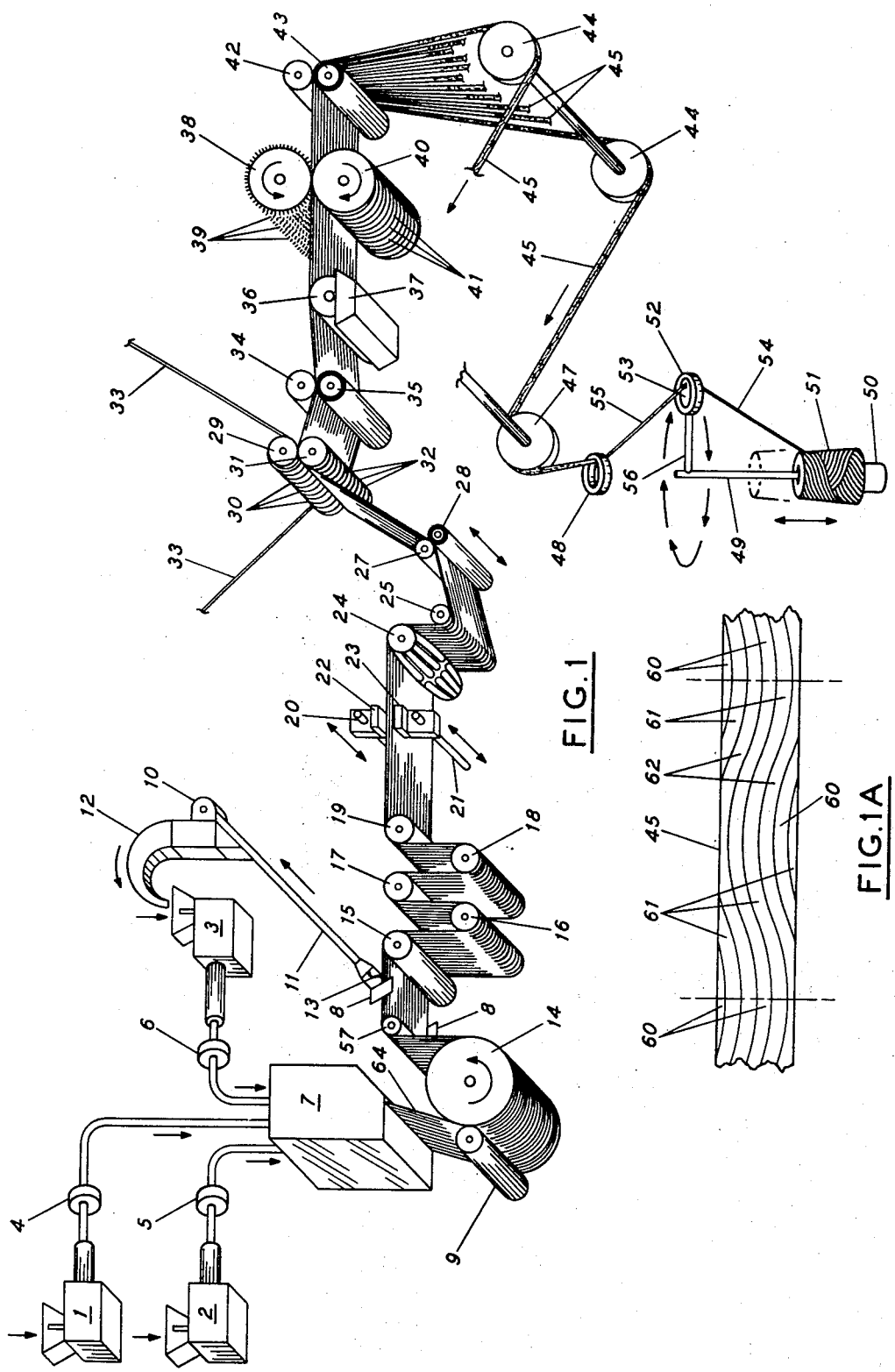
FIG. 1 is a schematic diagram illustrating the steps of the process for making yarn from thermoplastic polymer film. The steps shown include melting the thermoplastic polymer, extruding the thermoplastic polymer film through an extruding head made in accordance with this invention, orienting the thermoplastic polymer film, oscillating the film, cutting the film into uniform strips, fibrillating the strips, twisting the strips and collecting the yarn.
FIG. 1A is a magnified view of an individual strip of film, illustrating the alternation of portions of stripes of the different polymers along the edge which is obtained by oscillation.
Figure 2:
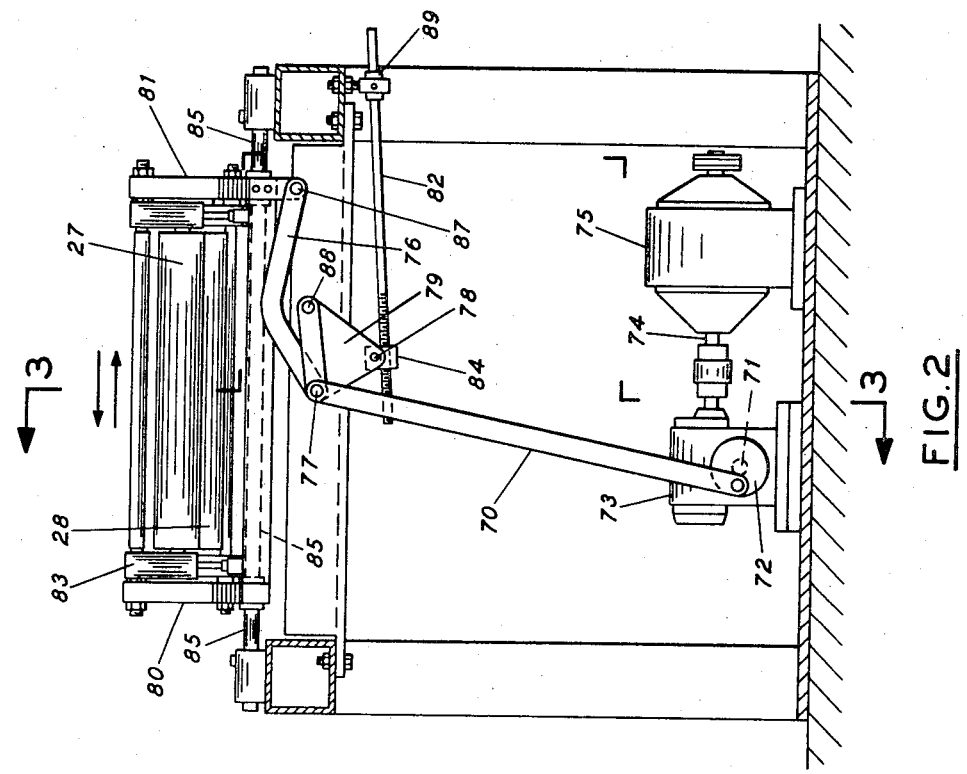
FIG. 2 is an end view of one embodiment for oscillating the thermoplastic polymer film prior to cutting.
Figure 3:
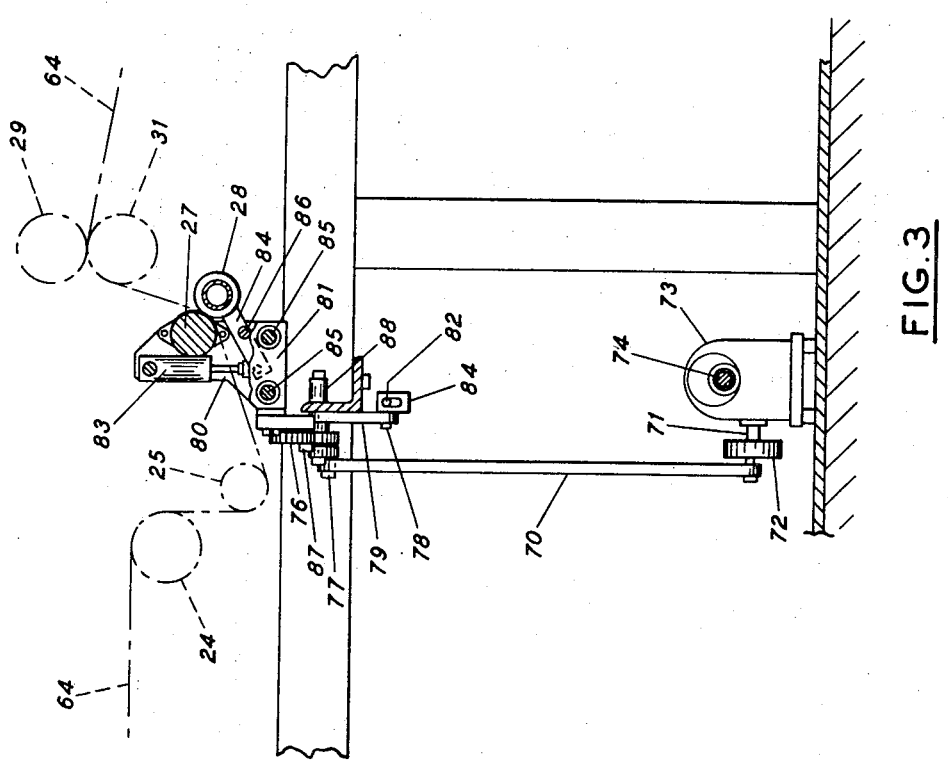
FIG. 3 is a section of the mechanical oscillator illustrated in FIG. 2.

Referring now to FIG. 1, it can be seen that different thermoplastic polymer stocks can be introduced into melt screw extruders 1, 2, and 3. These extruders melt the polymer stock and force it at a predetermined pressure and temperature through tubing to die 7. Thermocouples and pressure sensitive switches are contained in monitoring devices 4, 5, and 6 to continuously provide information to extruders 1, 2, and 3 so that correct pressures and temperatures are maintained for each polymer stream. Positive displacement metering pumps can also be used to control the polymer flow to the die. The temperature of the polymer must be great enough to exceed the melting point and high enough to reduce the viscosity so it can be readily extruded. It should not be so high that degradation such as thermal degradation occurs. The temperature of each polymer stream is individually controlled so that its melt characteristics are very nearly like the melt characteristics of each other stream so that desirably each stripe will cover the same cross sectional area in the finished film. Since the addition of pigments or stabilizers changes the melt characteristics of any polymer, it may be necessary to maintain the streams at different temperatures in order to obtain comparable melt characteristics. Even when viscosity is reduced, pressures on the order of 1,000 psi are required to effectively extrude the thermoplastic polymers.

Each polymer proceeds through die 7 via a separate conduit and is extruded from die 7 via its own series of outlets to form, in conjunction with the other molten thermoplastic polymers, film 64. The series of outlets for each polymer are displaced so that the different polymers on film 64 appear in alternating sequence as stripes. Film 64 is taken up on casting roll 14, maintained at temperatures between 32 and 190°F. The thickness of the unoriented film can vary from one mil to 10 or more mills, depending on the desired denier, and is controlled by the rate of polymer flow and the adjustment of the adjustable extrusion lip of the extrusion head. The multicomponent film is then processed in accordance with the procedure described in the referenced patent application Ser. No. 114,796, and subsequently converted into yarn.

In the embodiment shown in FIG. 1, the thickness of the oriented film is continuously monitored to insure that no critical flaws have been introduced by extrusion and orientation. Film thickness also affects the denier of the yarn produced if a constant strip width is maintained. A beta source is mounted in housing 22 which is adapted to slide back and forth along bar 20. A beta detector is mounted in housing 23 which is similarly adapted to slide back and forth on bar 21. The movements of housing 22 and housing 23 are coordinated so that the beta signal received by the beta ray detector in housing 23 will be a function only of the thickness of the intervening absorbing material. Such beta ray thickness detectors are well known in the polymer film art. If flaws or thin streaks are detected, then the die can be adjusted or other corrective measures can be taken, if possible without stopping the production line.

In order to produce polymer film suitable for transformation into yarn, it is desirable to maintain uniform thickness for the film and it is desirable that uniform polymer mixes be obtained. It is also important that the bonding between the alternating different polymers be strong enough to not rupture along their boundaries during orientation, cutting and fibrillation. These results are achieved by various features of the die means illustrated in FIGS. 4, 5, 6, and 7. FIG. 4 is a sectional end view of the die means, illustrating internal conduits 94, 95 and 96, and the extrusion surface formed by lip means 90 and 91 in relation to body 104. It is evident that FIGS. 5, 6, and 7 are sectional views of FIG. 4.

In FIG. 4 separate conduits 94, 95, and 96, which permit the passage of individually different polymers, are shown to extend from the topmost portion of body 104 to insert means 106. After the individually different molten polymers move through conduit means 94, 95 and 96, they pass through outlets 100, 101, and 102, respectively, configured within insert means 106. As is evident by reference to FIGS. 5, 6, and 7, outlets 102, 101 and 100 respectively, represent a series of outlets displaced in relation to each other for the purpose of producing a sequence of alternating different polymers which appear as stripes in the extruded thermoplastic polymer film. The sequence of different polymers can be altered by replacing insert means 106 with another insert means which has the outlets for the individual polymers displaced in different spatial relation. A two-polymer film or a film with more than three polymers can be produced by changing insert means 106. Since conduits 94, 95 and 96 are separate entities, it is possible to intermix thermoplastic polymers. For example, a nylon stripe might be alternated with a polypropylene stripe if the specification of the finished product required such a mixture, providing adequate bonding between non-polar polypropylene and polar nylon was obtained by modification of one or the other. Plugs 97 and 98 in conduits 94 and 95, respectively, permit the colored polymer in conduit 96 to be the exclusive color on the sides of the film.

Thermocouples 92 and 99 are implanted in the side of the die means in order to monitor continuously the internal temperature. The output of these thermocouples are used to control heater means which are placed around the exterior of the die means to maintain the die means at the best mean of the temperatures of the three individual polymer streams. In one embodiment of my invention, the die means is insulated to facilitate the maintenance of a constant mean temperature. The individual polymer stream temperatures, which are dependent upon the desired melt characteristics, are controlled by the melt screw extruders. Fortunately, the stream temperatures remain nearly constant since heat transfer through polymers is negligible and polymer flow is laminar. The die means is maintained at the best mean of the three stream temperatures in order to minimize any variations in the temperatures of the individual streams.

As the molten polymer stock is forced from outlets 100, 101 and 102 in alternating sequence, it is constrained by lip means formed by opposing members 90 and 91. The continuous flow of the polymer stock from outlets 100, 101 and 102, forms a continuous film. The film moves between opposing members 90 and 91 and is extruded externally at the bottom end of said opposing members. To insure adequate bonding between the molten polymer streams it is essential that a large pressure drop occur between the exit from insert means 106 and extrusion from opposing members 90 and 91. This pressure drop should be on the order of 500 - 1,500 psi and preferably at the upper end of that range. The thickness of the extruded film may be controlled by the spacing between opposing members 90 and 91. This spacing can be varied by means of screw 93 which forces the bottom of member 91 against the bottom of member 90. Screw 93 is turned by means of head 103 and is maintained firmly in place by forcing threaded block 105 against the inside of the outside flanges of member 91. As shown previously in FIG. 1, the extruded film is quenched on cold roll 14 and then subjected to the remaining processing steps described in the referenced U.S. Pat. application Ser. No. 114,796.

Outlets 100, 101 and 102, in insert means 106, as shown in FIGS. 7, 6 and 5, respectively, are not uniformly spaced apart. In each of the figures, the outside outlets are spaced farther apart than the inner outlets. This spacing differential is required in order to compensate for the tendency of the film to neck-in towards the center during casting and orientation. If the polymer film is considered as a three-dimensional object, then it can be understood that orientation in the longitudinal direction will tend to decrease the width of the film, as well as the thickness. The use of roll orientation gives a uniform as well as a minimum decrease in width. It is an empirical fact that the sides of the film tend to decrease in width more than the inner portions of the film, and this requires the outside stripes to be made wider than the inner stripes before orientation so that stripes along the outer edge, while originally larger, become equal to the size of the inner strips after orientation.

The shape of outlets 100, 101 and 102 is cylindrical. Cylindrical outlets produce a film, having adequate bonding between the different polymer stripes. Thus, it was not necessary to use a special configuration for the outlets. However, other outlet shapes may be useful and are contemplated for this invention. These include rectangular outlets, an outlet shaped from a series of concave sides, or an elliptical outlet.

From FIGS. 5, 6, and 7, the formation of the alternating sequence of stripes of different polymers can be seen. The polymer in conduit 96 is forced through outlets 102 in insert means 106 to form the two sides of the film and every third stripe 60 within the film. The polymer within conduit 95 is forced through outlets 101 in insert means 106 to form stripe 61 adjacent to the wide band on the side and to form every third stripe 61 thereafter in the interior of the film. Similarly, the polymer in conduit 94 is forced through outlets 100 in insert means 106 to form the second stripe 62 from the wide band on the side and every third stripe 62 thereafter in the interior of the film. The concept of this die means and insert means can be adapted to two, four, five or more different polymers. Sufficient conduit means need only be provided within body 104 and insert means 106 need only be configured to provide a sufficient series of outlets in spaced relation to each other in order to increase or decrease the number of polymers. The number of stripes in each strip can also be varied to produce different yarn effects. For example, three stripes per strip produces a different effect than nine stripes per strip. The latter effect is more subtle.

Yarns destined for the indoor-outdoor carpet market which are prepared from thermoplastic polymer film are specially formulated with one or more of the well-known stabilizers. For example, the polymers may contain additives such as U.V. stabilizers, plasticizers, antioxidants, heat stabilizers, die acceptors, pigments, dies, and the like. When pigments are used to color the thermoplastic polymers, they are chosen for their compatability with the polymer and their inherent resistance to ultraviolet radiation. The selection of stabilizers is generally well known in the thermoplastic polymer art. To further illustrate the utility of the extruding die of this invention examples are presented hereinafter of its application in apparatus for making a Moresque yarn.

EXAMPLES

1. Polypropylene pellets of three different colors were used as feedstock for the process of the present invention. Pellets of Color A were introduced to a melt extruder maintained at a temperature of 446°F. and a pressure of 400 psig. Color B was introduced to a melt extruder maintained at a temperature of 473°F. and a pressure of 1,700 psig. Color C was introduced to a melt screw extruder maintained at a temperature of 452°F. and a pressure of 2,100 psig. The molten polymers were then individually introduced to melt pumps. Color A was introduced to a pump whose discharge was maintained at a pressure of 1,600 psig. Color B was introduced to a melt pump whose discharge was maintained at a pressure of 1,500 psig. Color C was introduced to a melt pump whose discharge was maintained at a pressure of 1,500 psig. The molten polymers under pressure were then introduced to a die means. Within the die means Color A was maintained at a temperature of 492°F., Color B was maintained at a temperature of 490°F. and Color C was maintained at a temperature of 489°F. The extruded film was taken up by a casting roll whose temperature was maintained at 64°F. Subsequently, the congealed film was stretched by a series of seven rolls. The speed of the first roll was 50 feet per minute and the speed of the seventh roll was 350 feet per minute. The temperatures of the seven rolls were, in sequence, 266°F., 276°F., 146°F., 284°F., 296°F., 82°F., and 56°F. The stretched film was then oscillated transverse to the longitudinal direction at an amplitude of 0.35 inches and at a frequency of 15 oscillations per minute. The width of the oriented film after being trimmed was 20 inches. The film was slit into strips of 0.7 inch widths, each of which had nine full stripes. The individual strips were then fibrillated and twisted to make Moresque yarn which was tufted into indoor-outdoor carpets with a Moresque appearance. These carpets possessed comparable aesthetic qualities to the better Moresque yarn carpets made by the traditional process of twisting individual yarns together and then tufting them into carpets. 2. Polypropylene pellets of three different colors were used as feedstock in the process of the present invention. Color A was introduced to a melt screw extruder maintained at a temperature of 432°F. and a pressure of 2,000 psig. Color B was introduced to a melt screw extruder maintained at a temperature of 443°F. and a pressure of 1,300 psig. Color C was introduced to a melt screw extruder maintained at a temperature of 443+F. and a pressure of 2,000 psig. The molten polymers were then introduced directly to a die means. The die means was maintained at a constant temperature of 500°F. The width of the die means was 8 inches. Upon extrusion from the die means, the film was taken up by a casting roll maintained at a temperature of 56° F. The film was then stretched by a series of five orientation rolls. The peripheral speed of the first roll was 16.4 feet per minute and the peripheral speed of the last roll was 114 feet per minute. The temperatures of the five rolls, in sequence, were: 270°F., 250°F., 79°F., 280°F., and 75°F. The film was then oscillated slightly transverse to the longitudinal direction. The oscillating film was cut into strips having 0.7-inch widths. Each strip contained nine stripes. The strips were then fibrillated, twisted, and collected to form Moresque yarn. The Moresque yarn was then tufted into indoor-outdoor carpets having the aesthetic qualities of the better Moresque yarn carpets made by the traditional process of twisting individual yarns together and then tufting them into carpets.

Additional tests were run for which complete data are not available. In one test a two-color film was produced by specially machining a new insert means 100, as shown in FIGS. 4, 5, 6 and 7. In another test, insert means was altered so that individual strips, as shown in FIG. 1A, contains three stripes. In an additional test, insert means 106 was machined so that each individual strip had 12 stripes per 0.7 inches. It was noted that the larger the number of stripes per strip, the less pronounced the Moresque effect. In a further test, insert means 106 was machined so that successive stripes had dissimilar widths. The finished product presented a mottled appearance. In many of the tests, the yarn was tufted into carpets. It was evident that a tremendous variety of finished products could be obtained by varying the number of colors or different polymers and the configuration of insert means 106.

Although a preferred embodiment of the present invention has been shown and described and several examples of its utility given, many modifications thereof may be made by a person skilled in the art without departing from the spirit of the invention, and it is desired to protect, by Letters Patent, all of the inventions falling within the scope of the following claims.

What is claimed is:

1. Die means for extruding a multicolored film comprising:
   a confined extrusion surface forming constraining elongated lip means through which a sheet of multicolored polymer film is extruded under pressure;
   said lip means having an upstream edge and an extrusion edge;
   replaceable insert means connected to the said upstream edge of said lip means;
   a first longitudinal row of conduits within said insert means, the downstream side of said conduits forming a first set of orifices in communication with said upstream edge of said lip means;
   at least a second longitudinal row of conduits separate from and interspaced among said first longitudinal row of conduits, the downstream side of said conduits forming a second set of orifices in communication with said upstream edge of said lip means;
   a body member housing said replaceable insert means and forming a first chamber and at least a second chamber, said first chamber being in communication with the upstream side of said first longitudinal row of conduits, said first longitudinal row of conduits forming a means for flowing a first colored molten thermoplastic polymer from said first chamber through said first set of orifices to spaced-apart locations along said upstream edge of said lip means and said at least second chamber being in communication with the upstream side of said at least second longitudinal row of conduits, said at least second longitudinal row of conduits forming a means for flowing at least a second colored molten thermoplastic polymer from said at least second chamber through said second set of orifices to spaced-apart locations along said upstream edge of said lip means; means spacing said first set of orifices in relation to the interspaced said second set of orifices in a position to cause a stream of said first polymer to be placed in edge contact with a stream of said second polymer within said lip means; and
   means for supplying said first chamber and said at least second chamber with differently colored thermoplastic polymers at temperatures and pressures suitable for extrusion into and through said lip means.

2. The die for extruding multicolored film from thermoplastic polymers according to claim 1 wherein said replaceable insert means may be removed from said body member and replaced with an insert means having a different configuration of conduits to thereby produce a multicolored film of a different pattern.

3. Die means for extruding a continuous sheet of film formed from stripes of thermoplastic polymer stock comprising:
   elongated lip means through which a sheet of polymer film is extruded under pressure;
   said lip means having an upstream edge and an extrusion edge with said upstream edge spaced laterally apart from said extrusion edge;
   an extrusion surface within said lip means and positioned between the laterally spaced apart said upstream edge and said extrusion edge;
   replaceable insert means connected to the said upstream edge of said lip means;
   a first longitudinal row of conduits within said insert means, the downstream side of said conduits forming a first set of orifices in communication with said upstream edge of said lip means;
   at least a second longitudinal row of conduits within said insert means separate from and interspaced among said first longitudinal row of conduits, the downstream side of said conduits of said second row forming a second set of said orifices in communication with said upstream edge of said lip means;
   a body member housing said insert means and forming a first chamber and at least a second chamber, said first chamber being in communication with the upstream side of said first longitudinal row of conduits, said first longitudinal row of conduits forming a means for flowing a first molten thermoplastic polymer from said first chamber through said first set of orifices to spaced-apart locations along said extrusion surface of said lip means, said at least second chamber being in communication with the upstream side of said at least second longitudinal row of conduits, said at least second longitudinal row of conduits forming a means for flowing at least a second molten thermoplastic polymer from said at least second chamber through said second set of orifices to spaced-apart locations along said extrusion surface of said lip means;
   means spacing said first set of orifices in relation to the interspaced said second set of said orifices to cause a stream of said first polymer being extruded along said extrusion surface to be placed in edge contact with an adjacent stream of said second polymer being extruded along said extrusion surface; and
   means for supplying said first chamber and said at least second chamber with different thermoplastic polymers at temperatures and pressures suitable for extrusion into and through said lip means.

4. Die means for extruding a continuous sheet of film formed from stripes of different thermoplastic polymer stock bonded together edge to edge comprising:
elongated lip means through which a sheet of thermoplastic polymer film is extruded under pressure,
an extrusion edge on said lip means,
spaced-apart opposing members forming said extrusion edge,
means for adjusting the spacing of said spaced-apart members to control the thickness of said sheet of film extruded from said lip means,
insert means connected to said lip means,
a first longitudinal row of conduits within said insert means with said conduits forming a first set of orifices in communication with said lip means,
a second longitudinal row of conduits separate from and interspaced among said forst longitudinal row of conduits with said second conduits forming a second set of orifices in communication with said lip means,
a body member housing said insert means and forming a first chamber and a second chamber,
said first chamber being in communication with said first longitudinal row of conduits,
said first longitudinal row of conduits forming a means for flowing a first molten thermoplastic polymer from said first chamber through said first set of orifices to first spaced-apart locations along said lip means,
said second chamber being in communication with said second longitudinal row of conduits,
said second longitudinal row of conduits forming a means for flowing a second molten thermoplastic polymer from said second chamber through said second set of orifices to second spaced-apart locations adjacent to said first spaced-apart locations along said lip means,
means for supplying said first chamber and said second chamber with different thermoplastic polymers at temperatures and pressures suitable for extrusion, and
means for controlling the pressure on said thermoplastic polymer within said lip means.

5. Die means for extruding a continuous sheet of film formed of alternating stripes of different thermoplastic polymers comprising:
lip means through which said sheet is extruded under pressure,
a first row of conduits in communication with said lip means with each of the conduits of said first row communicating with said lip means at first spaced-apart locations within said lip means,
a second row of conduits,
said second row of conduits communicating with said lip means at second spaced-apart locations within said lip means separate from and interspaced among and adjacent to said locations of said first row of conduits,
a first chamber in communication with said first row of conduits,
said first row of conduits forming passage means for flowing a first molten thermoplastic polymer from said first chamber to said first spaced-apart locations within and along said lip means,
a second chamber in communication with said second row of conduits,
said second row of conduits forming passage means for flowing a second molten thermoplastic polymer from said second chamber to said second spaced-apart locations within and along said lip means,
means spacing said locations of said first row of conduits in relation to the interspaced said locations of said second row of conduits to cause a stream of the extruding said first molten thermoplastic polymer to be placed in adhering edge contact with a stream of the extruding said second molten thermoplastic polymer within said lip means while said polymers are being extruded therethrough.
means for supplying said first chamber and said second chamber with respective different thermoplastic polymers at respective temperatures and respective pressures suitable for extrusion thereof, and
means for adjusting the pressure of the extruding polymers within said lip means.

* * * * *